April 7, 1964     H. L. HOOVER     3,127,705
WATER LEAKAGE INHIBITING MASONRY TREATMENT
Filed Sept. 23, 1960
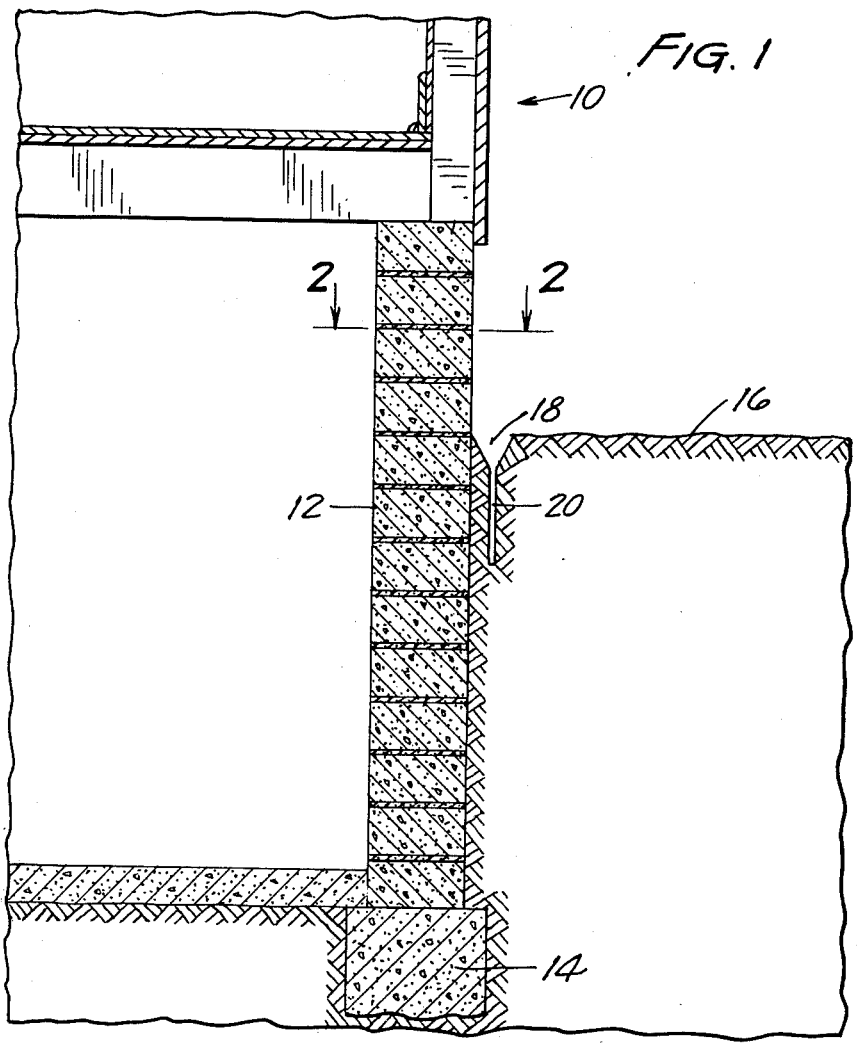
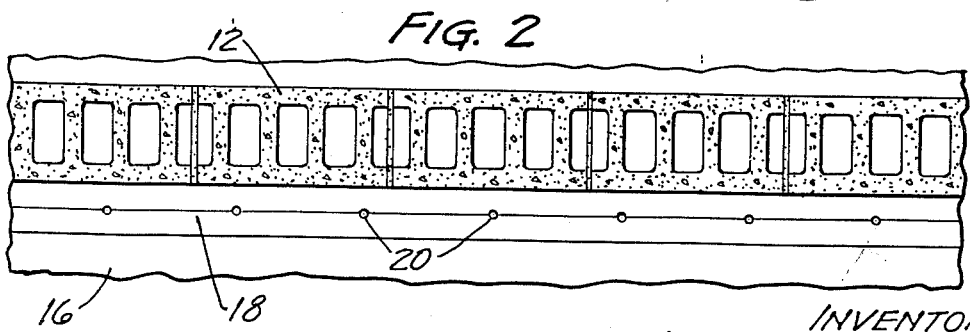
INVENTOR
HOWARD L. HOOVER
BY
Donald M. Sell
ATTORNEY United States Patent Office 3,127,705
Patented Apr. 7, 1964

3,127,705
WATER LEAKAGE INHIBITING MASONRY
TREATMENT
Howard L. Hoover, 168 Swan Ave., North St. Paul, Minn.
Filed Sept. 23, 1960, Ser. No. 58,124
3 Claims. (Cl. 50—532)

This invention relates to means for reducing the water permeability of masonry structures such as poured or cast concrete, concrete block, mortar joined brick, stone and similar masonry constructions.

Excessive water leakage through masonry has long been a problem in residential as well as industrial, governmental and other commercial structures. The problem of excessive water leakage is found in masonry floors, roofs and walls but is particularly prominent and is most often encountered in masonry wall structures at and below ground level.

Unfortunately, water leakage through underground masonry wall structures does not usually become manifest until the walls have been covered with ground fill for a considerable period of time, as it takes months, or even years, depending on the masonry thickness and the kind and sufficiency of preliminary surface sealing treatment applied before covering a wall over with ground fill, for the water to permeate through the masonry. Then, of course, the conventional pretreating methods to seal masonry against water permeability are no longer available because the masonry is covered.

While resort can be had to massive excavation to expose the walls for further treatment with mastic substances, asphaltic materials, tarpaper or plastic films, and/or combinations of these treatments, this procedure is per se exceedingly expensive and far beyond the reach of most residential owners and is ofttimes not available, because it would be structurally dangerous to remove the ground fill, or because of lack of space. Landscaping and treatment of the surface soil can be both expensive and hazardous with no positive assurance that further leakage will not occur. Thus, whether the leakage through the masonry wall structure occurs because of a sudden rainstorm or a constant hydrostatic head of water pressure on the outside of the wall, or by the transfer of moisture from earth in contact with the outside surface of the wall, and whether the leakage occurs through cracks in the masonry or by slow permeation through the pores, once the wall is in place and back fill covered, the problem of preventing water leakage is an extremely formidable one.

This invention provides a chemical treatment to halt subterranean masonry wall leakage. In this treatment a water soluble polymer which forms an insoluble film upon reaction with masonry is applied as an aqueous solution to the masonry. By supplying the treating chemical to the masonry in this manner the chemical can be simply circulated or percolated through the soil and follow the path of the soil moisture to the subterranean areas of high water concentration in contact with the masonry wall at the wall leakage sites.

Treatment is carried out by contacting masonry structures with water solutions of a water soluble polymeric acrylic acid material, i.e., polyacrylic and/or less preferably polymethacrylic acids, or those water soluble derivatives thereof such as the potassium, sodium and ammonium salts, and partial esters thereof (completely esterified acrylic polymers are not water soluble), which polymers are of sufficiently high molecular weight to convert to water insoluble films in the presence of high concentrations of insolubilizing alkali earth and other metals, particularly calcium, but also to such alkali earth metals as magnesium, strontium, and barium and other metals such as aluminum, iron and silica which are often found in masonry. In the presence of masonry, which contains an abundance of available calcium in a form that can combine readily with these polymeric acrylic acid materials to form insoluble polymeric salts, these acid materials convert within a relatively short period of time into continuous, water insoluble surface films tenaciously adherent to the masonry surfaces on which they form to provide a water impermeable masonry surface coating.

Whether the polyacrylic acid material is in the initial form of a simple water soluble derivative or the acid itself, the insolubilizing reaction appears to take place by reaction of the insolubilizing metal with the acid groups of the polymer resulting in rapid insoluble film formation. When the acid polymers are used as contrasted with water soluble derivatives much faster insoluble film formation results than when the soluble derivatives are used (perhaps because with the derivatives, hydrolysis to the acid first must occur before the insolubilizing reaction). However, since the reactive groups are believed to be the acid groups the term "acid material" as used herein will be to designate the water soluble acrylic polymer whether it be an acid, salt, partially esterified, or other water soluble derivative thereof.

I have discovered that aqueous solutions of water soluble polymeric film forming acrylic acid materials are not only non-toxic and exceedingly safe to handle, but that they are only slowly reactive with the insolubilizing metals in concentrations found in normal soil. They are, however, rapidly reactive with the higher concentrations of these metals found in masonry structures such as stone, concrete, mortar and the like. Thus, as a solution percolates through the soil in the vicinity of a masonry structure, essentially all of the solution flows to the surface of the masonry before reaction with the masonry calcium (and possibly aluminum, magnesium, strontium, and/or barium) takes place to form an insoluble film. Consequently, not only are there no toxicity problem involved in this treatment, but the treatment is such that the chemical, being initially water soluble, seeks the most travelled subterranean water route to the masonry structure e.g., foundation or tank wall or the like, which is generally the area of leakage it is desired to seal.

As previously noted, the reaction at the masonry surface is believed one of changing the water soluble polyacrylic acid material into an insoluble, film forming complex of alkali earth metals. While the molecular weight range to provide soluble starting polyacrylic materials will vary with the concentration desired, whether the acid is sufficiently soluble can be readily determined by simply adding to water in the concentration desired and observing whether or not it dissolves. In the practice of the invention the polyacrylic acid is supplied in aqueous solution, usually as a 5 to 20% solids concentration in water, as in these concentrations the solutions are of fast flowing low viscosities. While higher concentrations can be used, these high concentrations become more viscous and are not preferred. To determine whether the molecular weight is sufficiently high to form an insoluble film, upon conversion of the acid to an insoluble salt, the solution can simply be coated onto a piece of masonry such as a concrete block or the like and the film forming properties can readily be determined visually by observing the formation of a continuous film, and by water permeability tests thereafter. In practice, I have found acid materials in a molecular weight range of 90,000 to 100,000 are quite satisfactory.

My new treatment to seal masonry against leakage is believed to solve a long existing problem in the art. There are no toxicity problems in handling the water solutions of polyacrylic acid and anyone may handle these solutions without fear of skin damage or other damage from spillage or skin contact. This enables unrestricted marketability through normal retail outlets such as hardware stores and department stores, as well as building supply houses. The solutions by their very nature tend to flow to the areas of greatest moisture concentration when percolated through the soil to a subterranean masonry structure; further, the percolating solution takes any guesswork out of whether or not the surface areas most in need of treatment are those being treated as the solution tends to follow the most travelled water path through the soil. Therefore, the areas of greatest moisture concentration wherein the masonry permeability is probably most critical are the precise areas treated by the water solutions of this invention. By the slow reactivity rate of the polyacrylic acid material with the normally small calcium concentrations in the soil, the solution is preserved intact until contact with the masonry wall whereupon the higher concentrations of calcium and other insolubilizing metals and metal complexes quickly converts the soluble solution into an insoluble film. Digging out back-fill as a requisite to repairing masonry leaks is eliminated. A preferred procedure in the sealing of basement walls and the like with such a solution is illustrated in the accompanying drawing, wherein:

FIGURE 1 is a partially schematic cross sectional view through a foundation wall of a residential dwelling or the like; and FIGURE 2 is a top view looking down on the area around the foundation wall from substantially the position shown in section line 2—2 of FIGURE 1.

As illustrated in FIGURE 1, a dwelling structure or the like is depicted in its entirety by the numeral 10 having a basement wall of concrete, cinder blocks or like masonry construction 12 resting on a footer 14. The outside of the basement wall 12 which forms the confining wall for the basement of the dwelling 10 is embedded in the soil, being covered with back-fill or ground-fill 16 in the conventional manner.

To apply the polyacrylic acid solution to the wall 12, a small, shallow, possibly 6 to 12 inch deep, V-shaped trench or ditch is dug around the foundation wall in the manner illustrated, this ditch being designated by the numeral 18. At spaced intervals along the floor of the ditch 18 by means of a long metal rod or the like vertical holes are punched as at 20 by means of a stick or rod or the like.

With an average foundation wall 6 to 8 feet of which is underground, about 1 gallon of 8% by weight polyacrylic acid solution in water, when percolated into the soil through the ditch 18, has been found sufficient to treat about 10 lineal feet of wall to prevent leakage. Treatments of the foregoing nature have been found to effectively stop even chronic basement leakages, and, of course, the treatment may be repeated as often as required.

By ditching as at 18 and the further provision of passage bores 20 through the bottom of the ditch, the polyacrylic acid solution quickly percolates down through the soil and in the same manner that the surface drainage or underground drainage of water to the leaky basement areas takes place, the polyacrylic acid solution flows to the effected areas. Upon contact with the masonry, the high concentration of polyacrylic acid insolubilizing calcium compounds in the masonry converts this polymer to an insoluble, water-insoluble film which permanently anchors to the basement wall structure. As the film is of a pliable nature rather than a brittle, set nature so long as it remains in contact with water, minor earth tremors, house settlings and such other vibrations as may cause masonry cracks do not disrupt the film coating continuity.

While the foregoing is by far the simplest method of applying the polyacrylic acid to outside masonry wall structures which are underground, depending on the drainage conditions of the surrounding soil, the type of soil, and the location of the wall to be treated, other and more effective methods than the simple trenching noted may be resorted to. Thus, in some instances it may be desirable to force pump the solution through a tube directly into a known subterranean body of water backed up against the foundation and in others the solution could be poured onto the soil with no ditching or other preparation.

In new constructions to seal the outside surfaces before backfilling or to seal the inside surfaces of masonry walls, the polyacrylic acid solution can be applied by a brush or roller, or even by hose or paint spray to form an impermeable film of such walls; and floors can be sealed the same way. Paint formulations can also be made utilizing polyacrylic acid-water solutions as a masonry sealing agent by the addition of such solutions to paint mixtures containing conventional pigments such as titanium dioxide, iron oxide, Prussian blue, etc.

Also, the polyacrylic acid can be provided as a paper saturation, the paper being saturated with a polyacrylic acid-water solution, and dried. Such a saturated paper could be applied to an outside wall surface, much in the manner of tarpaper before back-fill is added, by simply wetting either the paper or the wall surface or both and applying the paper to the wall while wet, the resulting insoluble film serving both to adhere the paper to the wall and to seal the wall.

While the polyacrylic acid materials are generally supplied as 5 to 20% solids in water solutions, these concentrations are not critical and concentrations as low as 2.5% solids in water have proved effective. The upper limit of solids depends on several factors such as the molecular weight of the acid material (which is to some degree a measure of the solubility), the thickening effect of the acid material in the water, and the manner of application contemplated; conceivably, 50% solids solutions may be quite effective for painting or other applications where extreme fluidity is not required.

In some of the specific examples following, which are illustrative only, concrete cap blocks were tested for water permeability as they represent a typical masonry product designed and adapted to be used in the masonry constructions normally subjected to subterranean moisture exposed walls. Further, these blocks have wells extending about ⅔ of the way therethrough opening into one face of the blocks.

*Example 1*

The wells of a cap block were filled with ordinary tap water. Within 15 minutes following the filling of the concrete block, the tap water had completely drained through the block and none remained in the wells.

Thereafter, a 5% solution of polyacrylic acid in water was used to completely fill the block wells of a second block. At the end of 15 minutes the solution had dropped about .025 in. from the top of the well. Thereafter no measurable drop in the level of the liquid was observed, and after a period of 50 hrs., the level of the solution was exactly where it had been 15 minutes after pouring into the wells of the block. The wells were then emptied and refilled with water. The water level remained constant except for normal evaporation.

*Example 2*

The wells of a cap block were filled with a 2.5% solution of polyacrylic acid in water. The solution permeated the block to the point that it wetted the outside of the block, and, for a few minutes thereafter, for a total of about 35 minutes, the level of the solution continued to fall. The solution discontinued its flow through the block, no further drop in the level of the liquid was noted, and at the end of 50 hrs. the liquid stood at the same depth within the opening of the block at which it had been 35 minutes after the solution was introduced into the block.

Similar activity was noted, although a much slower rate was observed, with some of the soluble salts such as the sodium and ammonium salts of polyacrylic acid when placed in the cap block wells. In all instances after the initial drop in solution level had occurred, pouring out of the remaining solution and then filling the well with water resulted in a relatively constant water level within the well except for that loss by surface evaporation and in no instance was the outside of the block observed to be wetted.

*Example 3*

The basement of a house located in an extremely moist area adjacent to the shores of Silver Lake near North St. Paul, Minnesota, was treated with a 16% polyacrylic acid in water solution following the procedure illustrated in the drawing. The basement walls and floor of this house are set into clay soil, in the direct path of drainage from the surrounding terrain into the Silver Lake basin, the surface of the surrounding terrain slope is of the order of 10% decline toward the lake. No drain tiles are located around the basement footings or walls, and there is no established drainage aside from natural drainage through clay soil, through which accumulated ground water may be dissipated. Prior to treatment according to my invention, this basement was highly permeable to earth fluids, and, prior to treatment had, during the previous spring a constant flow of water through the walls and onto the basement floor for a period of about six weeks. Also thereafter, and until treatment, the walls of this basement leaked water to the point that it ran in a stream from the walls across the basement floor. During the following summer the same basement was treated in the following manner: a trench three to four inches deep and four to five inches wide was excavated immediately adjacent the exterior surface of the basement foundation. A 16% solution of polyacrylic acid in water was then introduced into the said ditch to a level of about one inch and allowed to seep down through the walls of the ditch. The said ditch was then refilled in the same manner with more of the same solution and permitted to dissipate into the ground adjacent to said wall. Thereafter the ditch was filled with water which was permitted to dissipate through the walls of the ditch into the surrounding soil, whereafter the said ditch was filled with earth. Since then, although all the conditions previously causing leakage have been present, the basement has remained dry and free from leakage.

*Example 4*

A 16% aqueous solution of polyacrylic acid was fed to 12 mice in an amount equal to 1 gram per kilogram of body weight per day for a period of a week with no fatalities. Additionally, into one eye of each of eight dogs was placed a few drops of this solution, while slight temporary redness was noted in the eyes of two of the animals, this disappeared rapidly and no other ill effects were observed.

These solutions can be used to reduce the susceptibility of any masonry structures to water leakage, and treatment with these polyacrylic acid solutions can be easily repeated if necessary. Thus, masonry blocks, tanks, piers, decks, roofs, posts, pipes, hulls, bridges and other structures can be beneficially treated in accordance with the principles of this invention either prior to or after incorporation into completed structures with aqueous solutions of water soluble polyacrylic acid materials in aqueous solution to react where in contact with such masonry to form adherent, water-impermeable surface films thereon.

While the solutions are prepared, as noted hereinbefore, as 5 to 20% solids in water, for most applications 5 to 10% solutions are generally preferred since these solutions generally have good flow characteristics regardless of the molecular weight of the soluble polyacid used.

Variations in the treating compositions can readily be made without departing from the spirit of the invention as by the admixture, or combining, with the water soluble acid material, polymeric or other additives to provide special effects, as for example to provide better flow characteristics, or more flexible or rigid film. As these as well as other minor modifications and changes will occur to those skilled in the art after a perusal of the foregoing description it is contemplated that all such changes and modifications will fall within the ambit of the appended claims.

I claim:

1. A method for arresting the below ground leakage of subterranean masonry wall structures which comprises percolating through the soil adjacent the masonry wall structure a free flowing solution which upon contact with masonry forms a solid, water insoluble complex by inter-reaction therewith, said solution consisting essentially of water and from about 5% to about 20% solids by weight of a water soluble polymer selected from the group consisting of polyacrylic acid, polymethacrylic acid, and the water-soluble salts of polyacrylic and polymethacrylic acids.

2. The method of claim 1 wherein said polymer is polyacrylic acid.

3. The method of claim 1 wherein said polymer is a polyacrylic acid salt.

References Cited in the file of this patent

UNITED STATES PATENTS

| | | |
|---|---|---|
| 2,175,804 | Van Hulst | Oct. 10, 1939 |
| 2,827,397 | Affleck | Mar. 18, 1958 |
| 2,858,892 | Carpenter | Nov. 4, 1958 |